United States Patent Office 2,902,127
Patented Sept. 1, 1959

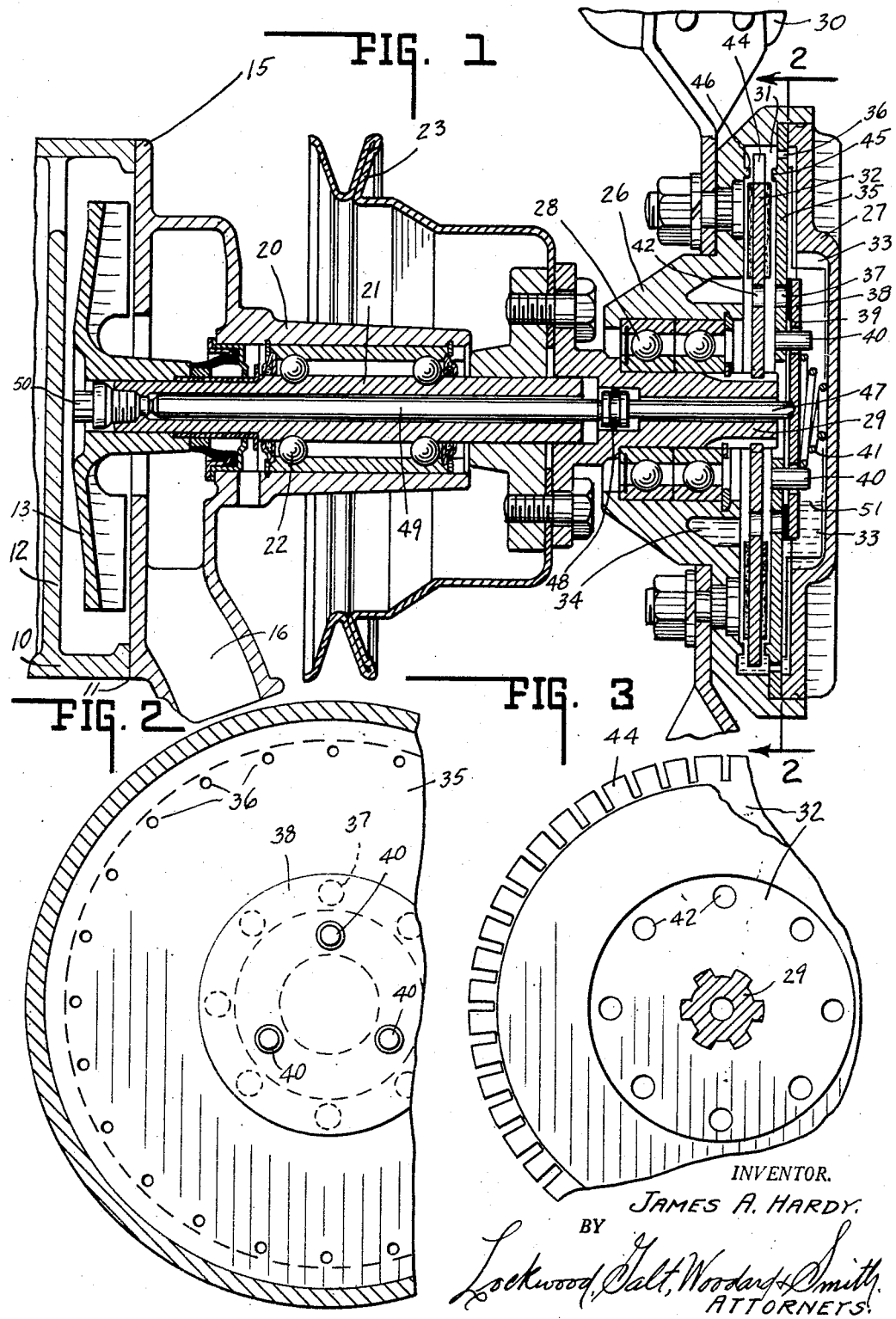
INVENTOR.
JAMES A. HARDY.

2,902,127

TORQUE TRANSMITTING FLUID COUPLING

James A. Hardy, Indianapolis, Ind., assignor to Schwitzer Corporation, Indianapolis, Ind., a corporation Application June 4, 1956, Serial No. 589,184

9 Claims. (Cl. 192—58)

This invention relates to a fluid coupling for driving accessory devices such as are commonly associated with an internal combustion engine or any similar driving means. Such appliances, for example, may include a radiator cooling fan, electric generator, air conditioner compressor or water pump.

Generally speaking, the power consumed by such accessories increases as the speed of the engine or driving means increases, but in many instances the demand for the useful output of such a driven appliance, beyond a certain maximum speed, increases, if at all, at a rate much less than that resulting from the increase in speed of the driving means or engine. A notable example of this condition is the radiator cooling fan. If such accessory is coupled directly to the engine, the power consumed thereby increases approximately as the cube of the engine speed increases, whereas the necessary speed for the fan, as an agency for inducing heat-exchanging air flow through the radiator, in most cases does not increase in proportion to the engine speed.

It is, therefore, the object of this invention to provide in an accessory-driving mechanism, a slippable coupling which will operate automatically with increased slippage as the driving or engine speed increases, thereby reducing the speed of, and the power consumed by the driven accessory.

Another object of the invention is to provide such an accessory drive in which slipping of the coupling may be controlled thermostatically or otherwise, to adjust the speed of the accessory to the performance demand that it must meet.

In carrying out the invention, there is provided a fluid coupling of the shear type comprising a pair of relatively rotatable elements, one preferably in the form of a disc-like rotor and the other in the form of a casing or housing enclosing such rotor and having wall surfaces spaced therefrom to provide a chamber for a supply of fluid. One or both of the coupling elements may be provided with means capable of creating a toroidal circulation of the fluid during periods in which the two elements are operating at different speeds, such fluid circulation serving to promote the dissipation of heat generated by the friction resulting from the slippage.

In couplings of this character it may be desired to impose a control for varying the torque delivery between the driving and driven elements. This is accomplished in this invention by means of a fluid control valve suitably actuated as by a thermo-responsive element in such manner that the supply of fluid within the fluid chamber of the housing and through which the torque is transmitted, may be varied through the control of the valve. For example, when the valve is closed there will be a minimum amount of torque transmitting fluid within the chamber in which the rotor operates, resulting in a minimum torque transmission with a maximum amount of slippage. In this condition the rotor and housing will rotate substantially freely relative to each other so that the driven element will be caused to rotate slowly as compared with the driving element. When the valve is opened the maximum amount of fluid will be permitted to enter the chamber, and due to the increase in fluid contact surfaces, a maximum torque will be developed so that the driven element will approach the speed of the driving element. Variable torque transmission and speeds will be developed through intermediate positions of the valve, such as to restrict the passage of fluid into the chamber.

The above is accomplished by providing the housing with a fluid reservoir separated from the chamber in which the rotor operates and communicating with said chamber by a valve controlled intake port near the axis of rotation and an exhaust port near the periphery. The valve is biased to closing position so that in this position, with no demand on the accessory drive, there will be a minimum amount of fluid in the chamber. This will permit the rotor to substantially free wheel in the chamber with little fluid shearing action so that a minimum amount of torque will be transmitted. However upon the system, for example a cooling system, heating up, the valve may be axially displaced to permit a limited amount of fluid to enter the chamber from the reservoir for torque transmission therethrough. The fluid in the chamber will thereupon build up, depending upon the valve restriction, through a toroidal circulation of maximum torque delivery when the valve is completely open. Upon the valve closing, the fluid will be discharged from the chamber by centrifugal force through the outlet port back into the reservoir, the toroidal circulation having been shut off. Upon the drive starting up cold, any fluid remaining in the chamber will be forced by centrifugal force through the outlet port into the reservoir until the valve is again caused to open.

The full nature of the invention will be understood from the accompanying drawings and the following description and claims:

Fig. 1 is a section taken axially through the coupling as applied to a cooling fan unit for an internal combustion engine;

Fig. 2 is a section taken on the line 2—2, or a front elevation of the coupling with the front cover plate of the housing removed; and Fig. 3 is a front elevation of the rotor with a portion broken away.

For illustrating one modification of the invention there is shown in Figs. 1 and 2 a valve controlled fluid coupling as applied to the radiator cooling fan for an internal combustion engine having a water jacket, a portion of which is shown at 10 formed as at 11 to provide a chamber 12 for a pump impeller 13 by which liquid coolant is circulated through the water jacket and an associated radiator, not shown. The open side of the chamber 12 is closed by a cover plate 15 providing an inlet 16 connected to the radiator and communicating with the pump chamber 12. The cover plate has an outwardly projecting hub 20 in which a pump shaft 21 is supported by the anti-friction bearings 22. The pump shaft extends in both directions beyond the axial limits of the hub 20, carrying the pump impeller 13 at one end and a drive pulley 23 at the other end, said drive pulley being adapted for connection to the engine crank shaft in the usual manner, as through the medium of a belt (not shown).

Secured to the pulley and shaft for rotation therewith there is a housing or casing comprising a cup-like element 26 having secured thereto an end cover 27. The element 26 of said housing carries anti-friction bearings 28 for rotatably mounting the housing upon a hub 29, the fan blades 30 being secured directly to said element, whereby the housing, carrying the fan blades, will freely rotate about said hub. Said housing, between the cup-like element 26 and the cover 27, is formed with a fluid chamber 31 in which there is mounted for rotation a disc-like rotor 32, said rotor being mounted at its axial center upon the end of the hub 29 for rotation therewith while permitting free floating axial movement.

The cover 27 is formed to provide a fluid reservoir 33, and the cup-like element 26 is formed with an annular fluid reservoir 34 on the opposite side of the rotor. The reservoir 33 is separated from the chamber 31 by a fixed plate 35 having its periphery clamped between the elements of the housing. The plate 35 is provided adjacent the periphery of the chamber with an annular series of relatively small restricted inlet ports 36 which lead from the chamber to the reservoir 33. Said plate also is provided with an annular series of relatively large outlet ports 37 more nearly the axial center of the housing. The outlet ports are adapted to be opened and closed by the axial movement of a valve plate 38 spanning said ports and provided with a sealing ring 39. Said valve plate is carried by, guided and supported on an annular series of lugs 40 carried by the fixed plate 35. Said valve plate is biased to position for closing the ports 37 by a conical spring 41 located within the lugs 40 for compression between said valve plate and the end cover 27 of the housing.

The rotor is provided with an annular series of transverse openings 42 arranged generally opposite to the outlet ports 37. The reservoir 34 in the element 26 is formed annularly to lie generally opposite the openings 42 and outlet ports. Said rotor may carry on opposite sides thereof a pair of non-metallic rings, which rings may be in the nature of cork facings to prevent metal to metal contact. About its periphery the rotor is formed with a series of spaced vanes 44. On the opposite sides of the vanes said element 26 and cover 27 are formed with inwardly extending guide rings 45, 46 to direct the passage of fluid into said vanes and tend to prevent recirculation of the fluid in the chamber between the opposing faces of the rotor and the walls thereof.

For axially shifting the valve to open position against the tension of spring 41 the hub 29 is centrally bored to receive a slidable shift pin 47 engageable at its free end with a central recess in the valve plate and having a sealing ring 48 at its opposite end. The drive shaft extends in alignment with the hub 29 and has slidably mounted therein a shift rod 49 with one end abutting the sealing end of the shift pin 47. The other end of said rod abuts a temperature responsive thermal element 50 to be controlled and affected by heat generated in the water cooling system.

The operation of the fluid coupling may be described as follows: When the engine and its cooling system are at rest, the reservoirs 33, 34 and chamber 31 will contain a suitable supply of fluid indicated at 51, at a level preferably below the bearing seals. Upon the shaft 21 and hub 29 being driven when cold, the valve plate 38 will be spring pressed to its closed position. Fluid in the reservoir 34 and the bottom of the chamber 31 will be delivered by centrifugal force generated by the rotor outwardly towards the periphery thereof and forced through inlet ports 36 to the reservoir 33. As the fluid is thus delivered to the reservoir it will accumulate therein, having no access back to the chamber 31. Thus, the rotor will substantially free wheel within the housing, transmitting very little torque thereto and to the fan. This will permit the engine to heat up. As the engine heats up, the element 50 will cause the shift pin 47 to axially displace the valve plate and cause the outlet ports 37 to open.

The rotating rotor will thereupon draw fluid from the reservoir 33 through the ports 37 to increase the fluid supply in the chamber 31. This will cause a film of fluid to be built up between the faces of the rotor and the walls of the chamber, the element 26 on one side and the fixed plate 35 on the other. Through the shearing action of the fluid about the surfaces of the rotor, torque will be delivered from the rotor to the housing, whereupon the fan will be driven at speeds approaching the driving speed of the rotor. During this driving action of the fluid, heat will be dissipated by causing the fluid to circulate in a path through the ports 36, the reservoir 33, the ports 37 and openings 42 and back between the rotor and the chamber walls. Since the rotor is the driving member, which drives through fluid shearing, it is bound to turn faster than the housing. Therefore, the pressure developed due to centrifugal force at the sides of the faster turning rotor will be greater than that in the space between the slower turning plate 35 and cover 27. This pressure differential will give the fluid the necessary motive force to circulate it through ports 36, reservoir 33, ports 37, and openings 42. In other words the faster turning rotor will pump fluid through the ports 36 into the space between plate 35 and cover 27. The amount of recirculation through the ports 37 is regulated by valve plate 38. Thus, there will be a cooling circulation of the fluid to prevent hot spots from occurring due to the shearing action in the fluid.

It should be understood, however, that since the fluid is incapable of transmitting torque without some slippage, the fan will be driven at a speed below that of the engine and rotor, and as the speed of the rotor increases the speed of the fan will likewise tend to increase, but as rotation of the fan at the higher speed requires rapidly rising torque, the slippage between the rotor and housing will increase. The torque transmitted by the rotor at any given rotational speed will depend principally on the viscosity of the fluid and upon the spacing between the friction faces of the rotor and the opposed faces of the housing member and fixed plate, the transmission of high torque being favored by the use of a high viscosity fluid and narrow spacing between the rotor and its opposed faces. Since the torque is transmitted from the rotor through the fluid to the housing, and the average angular velocity of the fluid being greater than that of the housing, the centrifugal force acting on the fluid at the sides of the rotor will be greater than that acting on the fluid in the space between the fixed plate 35 and cover 27. This causes the toroidal circulation of the fluid which serves to dissipate the heat generated as the result of the aforesaid slippage.

Whereas, for illustration the rotor is shown as the driving member and the housing as the driven member, this relation may be readily reversed, wherein the housing becomes the driving member and the rotor the driven member, with the cooling fan or other accessories suitably coupled to the rotor.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a torque transmitting fluid coupling, the combination of a driving element and a driven element, a fluid retaining housing connected with one of said elements, said housing defining an annular fluid chamber and a separate reservoir having a supply of fluid therein, a rotor disc connected with the other said element having opposed surfaces extending in close parallel face to face relation with the walls of said chamber whereby torque will be transmitted between said rotor and housing through the shear action of the fluid, and means comprising a valve on said housing operable to control the flow of fluid between said reservoir and said chamber.

2. In a torque transmitting fluid coupling, the combination of a driving element and a driven element, a fluid retaining housing connected with one of said elements, said housing defining an annular fluid chamber and a separate reservoir having a supply of fluid therein, a rotor disc connected with the other said element having opposed surfaces extending in close parallel face to face relation with the walls of said chamber whereby torque will be transmitted between said rotor and housing through the shear action of the fluid, means comprising a valve on said housing for controlling the flow of fluid between said reservoir and said chamber, and temperature responsive means operably connected with said valve for causing it to be moved to open position upon a rise in temperature and to closed position upon a drop in temperature.

3. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a fluid reservoir in said housing having an inlet port leading thereto from the periphery of said chamber and an outlet port disposed radially inwardly of said inlet port and leading from said reservoir to said chamber, for receiving fluid from said chamber through said inlet port under pressure of the centrifugal action of said rotor and introducing fluid into said chamber through said outlet port, and means comprising a valve on said housing biased to normally close said outlet port to prevent passage of fluid therethrough into said chamber and movable to position for opening said outlet port and permit flow of fluid therethrough.

4. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a fluid reservoir in said housing having an inlet port leading thereto from the periphery of said chamber and an outlet port disposed radially inwardly of said inlet port and leading from said reservoir to said chamber, for receiving fluid from said chamber through said inlet port under pressure of the centrifugal action of said rotor and introducing fluid into said chamber through said outlet port, means comprising a valve on said housing for opening and closing said outlet port to control the supply of fluid to said chamber, and temperature responsive means operably connected with said valve for moving it to port opening position upon a rise in temperature.

5. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a fluid containing reservoir in said housing, a wall fixed to said housing and defining adjacent sides of said chamber and said reservoir, said wall having a reservoir inlet port adjacent the periphery of said chamber and a reservoir outlet port positioned radially inwardly of said inlet port, a shiftable valve plate biased to outlet port closing position, and a temperature responsive member operably connected with said valve for shifting it to outlet port opening position upon a rise in temperature.

6. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a series of vanes extending about the periphery of said rotor, a fluid containing reservoir in said housing on one side of said rotor, a wall defining one side of said chamber separating said reservoir therefrom, said wall having a reservoir inlet port adjacent the peripheral vanes of said rotor leading from said chamber into said reservoir through which fluid is pumped by said vanes, an outlet port in said wall spaced inwardly of said inlet ports through which the fluid pumped into said reservoir may pass into said chamber, and means comprising a valve on said housing operable to control the passage of fluid from said reservoir to said chamber through said outlet port.

7. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a series of vanes extending about the periphery of said rotor, a fluid containing reservoir in said housing on one side of said rotor, a wall defining one side of said chamber separating said reservoir therefrom, said wall having a reservoir inlet port adjacent the peripheral vanes of said rotor leading from said chamber into said reservoir through which fluid is pumped by said vanes, an outlet port in said wall spaced inwardly of said inlet ports through which the fluid pumped into said reservoir may pass into said chamber, a valve plate in said reservoir biased to normally extend over and close said outlet port, and temperature responsive means operably connected with said valve plate to shift it to open position for permitting flow of fluid from said reservoir to said chamber through said outlet port upon a rise in temperature.

8. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, said rotor having a series of vanes about the periphery thereof, and an annular series of transverse openings inwardly of its periphery, a fluid containing pocket in said housing on one side of said rotor extending in alignment with said openings, a fluid containing reservoir in said housing on the other side of said rotor, a wall defining one side of said chamber separating said reservoir therefrom, said wall having a reservoir inlet port adjacent the vanes of said rotor leading from the periphery of said chamber to said reservoir for the passage of fluid under pressure developed by said vanes and the centrifugal force exerted by said rotor, said wall having an inwardly disposed outlet port leading from said reservoir to said chamber in line with the openings in said rotor, and means comprising a valve for normally closing said outlet port and operable upon an increase of temperature to open said outlet port to thereby permit a toroidal circulation of fluid radially outward through said chamber and inward through said reservoir.

9. In a torque transmitting fluid coupling, the combination of a driving element and a driven element, a fluid retaining housing connected with one of said elements, said housing defining an annular fluid chamber having a supply of fluid therein, a rotor disc connected with the other said element having opposed surfaces extending in close parallel face to face relation with the walls of said chamber whereby torque will be transmitted between said rotor and housing through the shear action of the fluid, a fluid containing reservoir in said housing to one side of said rotor, a wall defining one side of said chamber to separate the reservoir therefrom, said wall having a reservoir inlet port adjacent the periphery of the chamber and an outlet port inwardly thereof, means comprising a valve shiftable to open and close said outlet port, a control member operably connected with said valve to move it between open and closed position, and a pair of opposed inwardly extending guide rings formed on the walls of said chamber to extend inwardly adjacent and spaced from the peripheral portion of said rotor and radially inwardly of said inlet port to direct the fluid to the peripheral portion thereof and through said inlet port.

References Cited in the file of this patent

UNITED STATES PATENTS

| | | |
|---|---|---|
| 2,127,738 | Kugel | Aug. 23, 1938 |
| 2,629,472 | Sterner | Feb. 24, 1953 |
| 2,637,308 | Dodge | May 5, 1953 |
| 2,652,816 | Dodge | Sept. 22, 1953 |
| 2,706,547 | Ranzi | Apr. 19, 1955 |
| 2,714,946 | Tenot et al. | Aug. 9, 1955 |
| 2,792,095 | Sherman | May 14, 1957 |

FOREIGN PATENTS

| | | |
|---|---|---|
| 797,993 | France | Feb. 24, 1936 |